TWO MAGNETIC ELEMENT PER BIT MEMORY

Filed Feb. 25, 1964

Inventor.
Donal A. Meier

By: Louis A. Kline
John J. Matlago
Nathan Cass
His Attorneys.

TWO MAGNETIC ELEMENT PER BIT MEMORY

Filed Feb. 25, 1964

Inventor.
Donal A. Meier

By: Louis A. Kline
John T. Matlago
Nathan Cass
His Attorneys.

Inventor.
Donal A. Meier

By: Louis A. Kline
John J. Matlago
Nathan Cass
His Attorneys.

Inventor.
Donal A. Meier

By: Louis A. Kline
John J. Matlago
Nathan Cass
His Attorneys.

United States Patent Office 3,315,241

Patented Apr. 18, 1967

3,315,241

TWO MAGNETIC ELEMENT PER BIT MEMORY

Donal A. Meier, Inglewood, Calif., assignor to The National Cash Register Company, Dayton, Ohio, a corporation of Maryland Filed Feb. 25, 1964, Ser. No. 347,184
15 Claims. (Cl. 340—174)

This invention relates generally to memory devices for use in computers, and more particularly to an improved bistable memory matrix arrangement and construction.

With the ever increasing use of digital computers in the business world, it has become of considerable importance to provide improved high speed, high capacity random access matrix-type memories for use therein, and it is accordingly the broad object of the present invention to provide an improved construction and arrangement for a memory of this type.

It is well known that a major factor which greatly hinders obtaining improvements in many aspects of bistable memory matrices (such as speed, capacity, packing density, power requirements, etc.) has been and still is the generation of noise within the matrix during operation. Such noise occurs for a number of reasons, such as capacitive and inductive coupling between windings and lines, stray-field coupling, partial switching of elements, lack of uniformity of element characteristics, and variations in the pattern of information storage in the matrix. Accordingly, it is an important object of the present invention to provide a construction and arrangement for a magnetic memory matrix which is able to reduce the noise generated therein to extremely low levels, and thereby provide significant improvements in memory performance and capability.

In addition to the above considerations, it is also of importance that a memory matrix be of simplified and economical construction. Accordingly, another object of the present invention is to provide a bistable memory matrix which combines simplicity and economy with extremely low noise generation.

A still further object of the present invention is to provide an improved construction and arrangement for a bistable magnetic memory of the two element per bit type.

Yet another object of the present invention is to provide an improved organization and mode of operation for a bistable magnetic memory of the two element per bit type.

The features and advantages of the present invention will be illustrated herein as applied to a thin film rod memory matrix of the same basic type as illustrated in copendnig patent applications Ser. No. 795,934, filed Feb. 27, 1959, now Patent No. 3,228,012; Ser. No. 796,892, filed Mar. 3, 1959, now Patent No. 3,134,965; and Ser. No. 268,145, filed Mar. 26, 1963. The important distinction, however, is that by applying the teachings of the present invention, the performance and capability of a thin film rod memory matrix of this type are significantly enhanced beyond what would otherwise be obtainable. Briefly, in accordance with the invention, a novel and unique two rod per bit organization and operating mode is provided for such a thin film rod memory which achieves a remarkably high degree of balancing, resulting in a memory with extremely low noise generation.

The specific nature of the invention as well as other objects, uses and advantages thereof will become apparent from the following description of a thin film rod memory martix embodying the invention and illustrated in the accompanying drawings in which.

Figures 2, 3, 8, 8A:
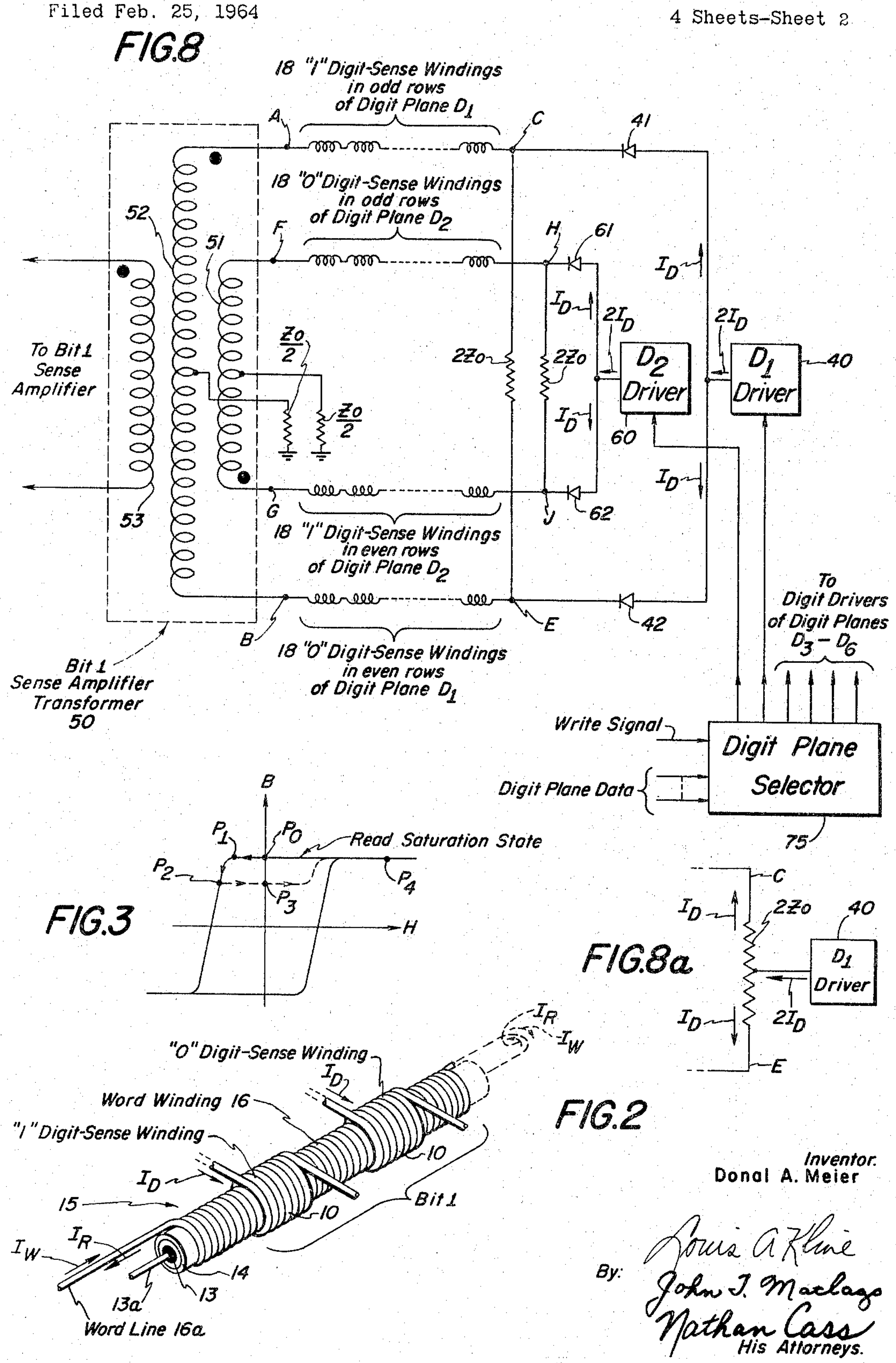
FIG. 2 is a fragmentary pictorial view showing a pair of 0 and 1 digit-sense windings of a typical bit and the respective portion of a rod structure passing therethrough.
FIG. 3 is a graph illustrating a preferred B-H loop characteristic for each individually switchable bistable element on the rods, and also illustrates the path followed by a typical bistable element during a writing and reading operation.
FIG. 8 is an electrical circuit diagram illustrating the connection and arrangement of the digit-sense windings in digit planes $D_1$ and $D_2$ of the matrix of FIG. 1 with respect to the sense amplifier coupling means and the digit plane drivers.
Figure 10:
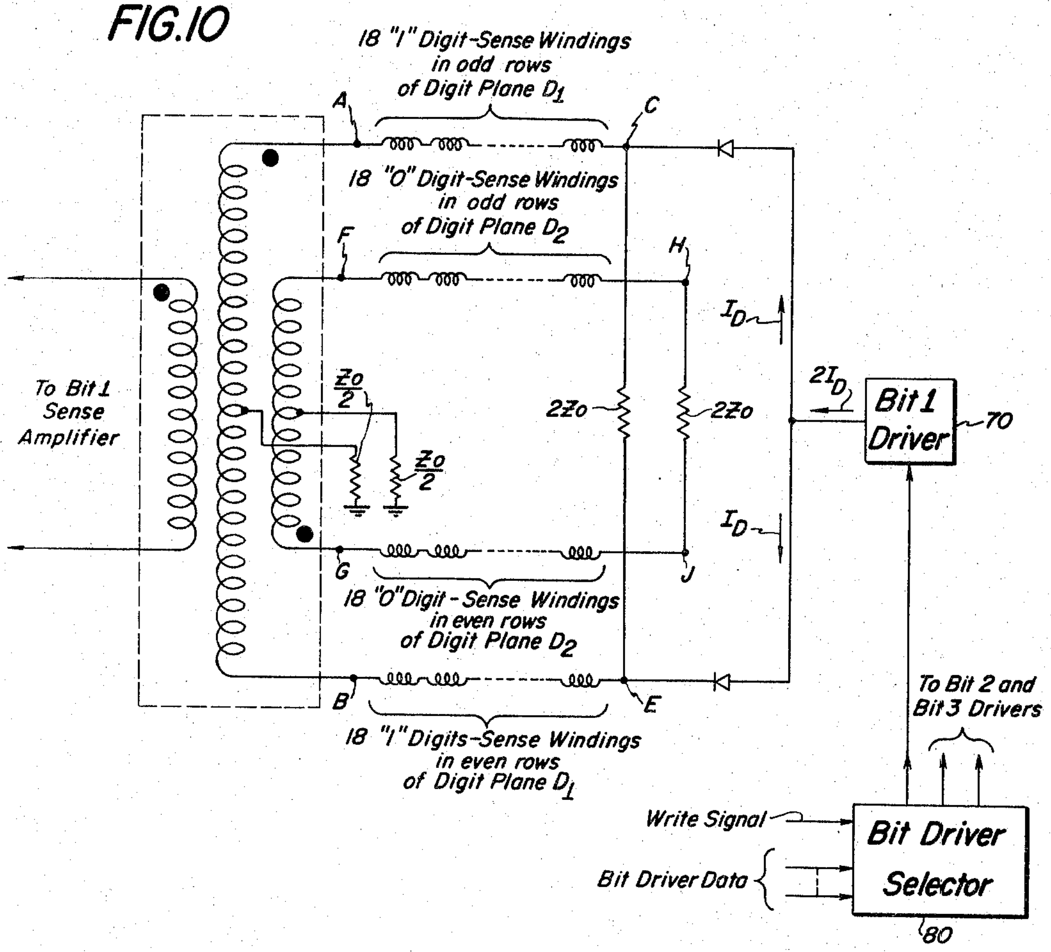
Figure 9:
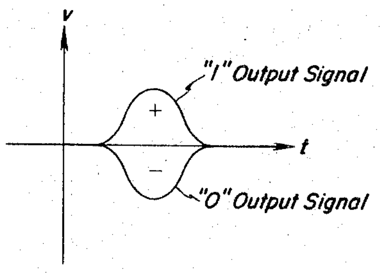
Figure 11:
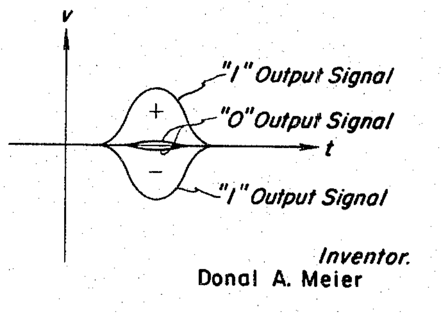

FIG. 8*a* is a fragmentary circuit diagram illustrating a modified digit current driving arrangement which could be employed in the circuit of FIG. 8;

FIG. 9 is a graph illustrating a 1 output signal and a 0 output signal applied to a bit sense amplifier as a result of the reading of a stored 1 and a stored 0 in a respective bit in the arrangement of FIG. 8;

FIG. 10 is an electrical circuit diagram illustrating a modification of the circuit of FIG. 8; and FIG. 11 is a graph illustrating a 1 output signal and a 0 output signal applied to a bit sense amplifier as a result of the reading of a stored 1 and a stored 0 in a respective bit in the modified arrangement of FIG. 10.

Like numerals designate like elements throughout the figures of the drawings.

Figure 1:
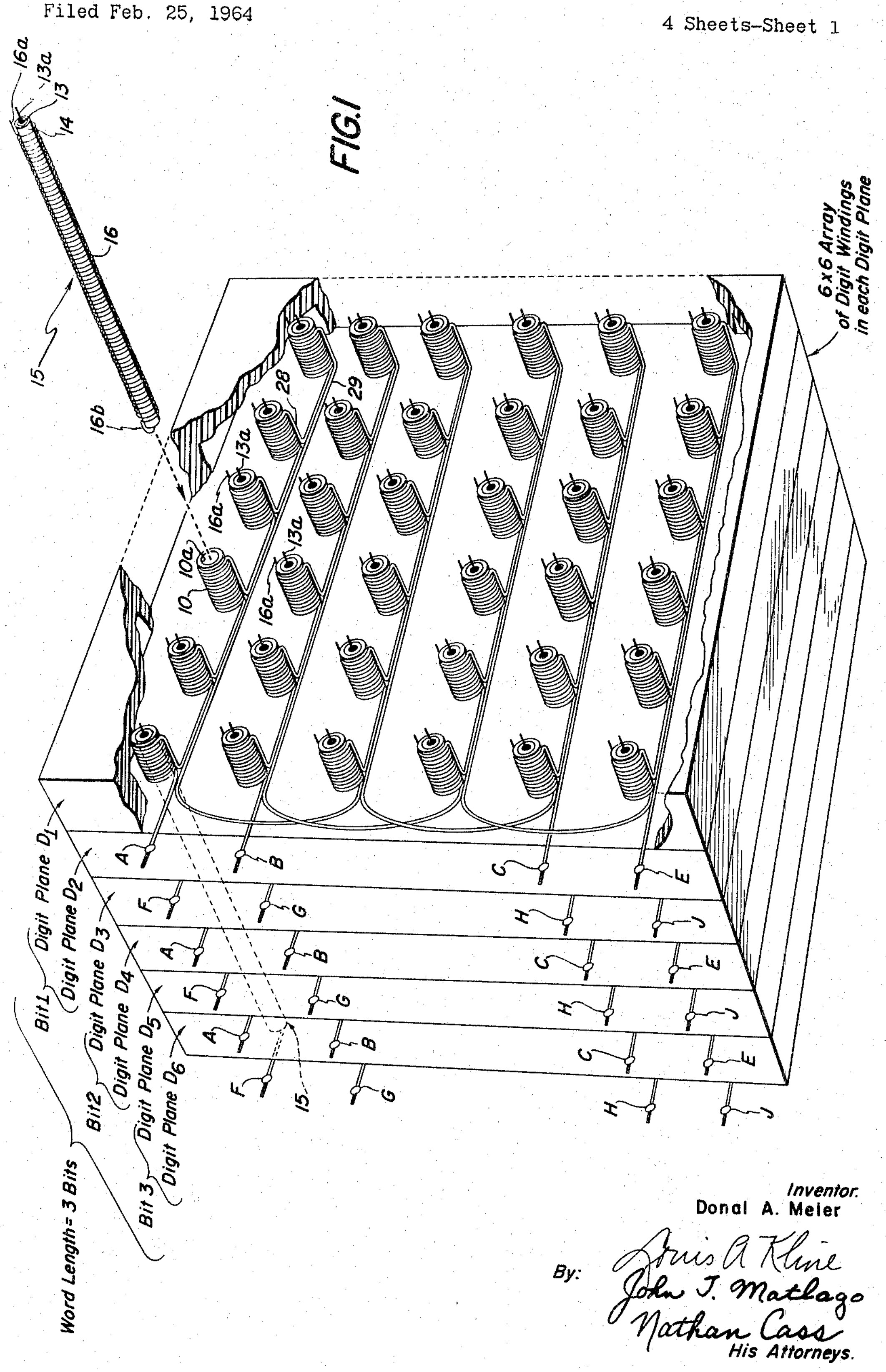
FIG. 1 is an overall pictorial view of a rod matrix incorporating the present invention, a single typical rod structure being shown external to the matrix in a position ready for insertion.

FIG. 1 illustrates an exemplary basic overall memory matrix structure which will be seen to be basically similar to those disclosed in the aforementioned copending patent applications. The exemplary memory structure of FIG. 1 comprises a plurality of digit planes (or plates) $D_1$–$D_6$ which are suitably stacked and secured together in aligned fashion, with rod structures 15 being provided passing perpendicularly through aligned bores provided in respective aligned digit windings in respective digit planes.

Each digit plane may comprise, for example, a 6 x 6 array of electrically interconnected digit-sense windings, and each digit-sense winding is constructed in the form of a solenoid 10 with a cylindrical bore 10*a* provided therein of a diameter preferably just sufficient to permit a respective thin film rod structure 15 and its associated word winding 16 (which is a coaxial helical solenoid) to be passed therethrough.

As indicated in FIGS. 1 and 2, each thin film rod structure 15 is preferably comprised of a long thin rod-like inner conductive substrate 13 of beryllium copper having a diameter of about 10 mils, and on which is suitably deposited a thin film magnetic coating 14 having bistable magnetic switching properties. The thickness of the thin magnetic film 14 should be small enough (about 10,000 angstroms or less) so that the film exhibits single domain switching properties. The thin magnetic film 14 may typically be an isotropic 1000 to 2000 angstrom electrodeposited coating of an alloy of approximately 97% iron and 3% nickel, or a suitable bilayer of the type lisclosed in the commonly assigned copending application Ser. No. 77,451, filed Dec. 21, 1960 now Patent No. ;,213,431, or a permalloy thin film of approximately ;0% nickel and 20% iron.

As noted previously, each rod structure 15 contains ι coaxial helical solenoid 16 closely wound on the rod and erves as a word winding as will become evident herenafter. The basic bistable magnetic storage element n the matrix is substantially the portion of the thin film nagnetic coating 14 which is in the immediate vicinity of ;ach digit-sense solenoid when the rod structure 15 is nserted in the matrix. Each rod structure, therefore, )rovides six individual bistable magnetic storage elements vhich, in a two magnetic element per bit arrangement, )rovides for the storage of three binary digits or bits.

In other words, in the typical embodiment being con;idered herein, each binary digit or bit is represented by he states of two adjacent bistable magnetic elements on he same rod structure. The manner in which these states ire used to represent a binary digit or bit is as follows. f it is assumed that the two states of a bistable magnetic ;lement are designated as A and B, then a 0 may be rep-esented in a two magnetic element per bit arrangement vhen one bistable element (hereinafter called the 0 bi;table magnetic element) of the binary digit resides in he A state, and the other bistable element (hereinafter ;alled the 1 bistable element) resides in the B state; and ι 1 may be represented by the reverse situation where the l bistable element of the binary digit resides in the A ;tate and the 0 bistable element resides in the B state.

The three binary digits which each rod structure is hus capable of storing in two magnetic element per bit ashion (as indicated above) may be considered to con;titute a three bit word. As is well known in the art, a vord is merely a convenient designation for a particular group of binary digits or bits which are handled together. Since there are 36 rods in the exemplary memory matrix shown in FIG. 1, the memory may be referred to as a 36 vord memory. Obviously, the memory may be enlarged o store many more words having many more binary digits per word, the memory illustrated in FIG. 1 being merely exemplary.

Before considering how the various digit-sense and word windings in the three dimensional matrix of FIG. 1 are interconnected, it will be helpful to first consider the manner in which a single binary digit or bit may be stored in and read out from its respective rod.

As mentioned previously, the two bistable magnetic elements which are used to represent a binary digit or bit in the two magnetic element per bit arrangement being employed herein are chosen as adjacent portions on the same rod. Such a choice is highly advantageous since these two adjacent portions can be expected to have very similar magnetic properties as a result of the fact that a rod can be fabricated under continuous, automatic procedures which produce highly uniform thin film coatings, particularly on the same rod, and most particularly on adjacent portions on the same rod. A typical manner in which such automatic fabrication can be provided is described in the article "The Magnetic Rod—A Cylindrical, Thin-Film Memory Element" by D. A. Meier and A. J. Kolk, published on pages 195–212 in the book "Large-Capacity Memory Techniques for Computing Systems," edited by Marshall C. Yovits, The Macmillan Company, New York, 1962.

Referring now to FIG. 2, a fragmentary portion of a rod structure 15 is illustrated corresponding to digit planes $D_1$ and $D_2$ and showing the respective digit-sense solenoids corresponding to bit 1 which are disposed over adjacent portions of the rod and its word winding 16 when the rod structure 15 is inserted in the matrix. The thin magnetic film 14 on the rod is preferably initially magnetized throughout its length to the read saturation state, as indicated in the preferred B-H hysteresis curve of FIG. 3, which is advantageous because signals tending to drive the thin film away from the read state will then not be influenced by demagnetization. In the absence of any applied field, therefore, the two respective bistable magnetic elements encircled by their respective digit-sense solenoids and the respective concentric portions of the word winding 16 will initially reside in the read saturation state at point $P_0$ in FIG. 3. As will become evident hereinafter, point $P_0$ is also the point at which both bistable elements will reside after a reading operation, since the mode of operation of the embodiment being described herein is of the destructive type.

The writing of a 1 or 0 into the two bistable elements constituting a binary digit or bit in FIG. 2 is accomplished as follows. When it is desired to write into a particular word in the array, a write current pulse $I_W$ is applied to the word winding 16 of the rod corresponding to the word which is selected for writing. This write current pulse $I_W$ flows through the word winding 16 and drives each bistable magnetic element of the selected word to point $P_1$ in FIG. 3, which as will be noted is insufficient to cause switching from the read saturation state.

Simultaneously with the write current pulse $I_W$, a digit current pulse $I_D$ is also applied, but to only one of the two digit-sense windings provided for each bit—that is, to either the 0 digit-sense winding or the 1 digit-sense winding of each bit of the selected word, depending on whether a 0 or a 1 is to be written in the respective bit. For example, for bit 1 in FIG. 2, if a 1 is to be written, the digit current pulse $I_D$ will be applied only to the 0 digit-sense winding. The effect of applying the digit current pulse $I_D$ simultaneously with the write current pulse $I_W$ causes the thus selected 0 or 1 bistable element of each bit to be switched out of the read saturation state to point $P_2$ in FIG. 3.

As a result, when the write and digit current pulses $I_W$ and $I_R$ are removed, the 1 or 0 bistable element of each bit which received only the write current pulse $I_W$ will return to point $P_0$, while the other bistable element of each bit which also received the digit current pulse $I_D$ will return to point $P_3$ in FIG. 3. It is to be noted for future reference that the digit current pulse $I_D$, like the write current pulse $I_W$, is insufficient by itself to cause switching.

In order to read out the data thus written into each bit of a selected word, as described above, a read current pulse $I_R$ is applied to the word winding 16 which drives all of the bistable elements of the selected word to point $P_4$ in FIG. 3. The read current pulse $I_R$ is preferably chosen considerably greater than the minimum required for switching in order to provide a rapid switching time. It will thus be understood that the particular bistable element of the pair constituting a bit which was switched to point $P_3$ during writing will now be switched back to the read saturation state during the reading operation. The change in flux which will then occur between $P_3$ and the read saturation state induces a signal into the respective digit-sense solenoid which is used as a sense winding during reading. The other bistable element of each bit, which will be at point $P_0$ after the writing operation, is also driven to point $P_4$, but since only a very small flux change occurs, only a negligible signal is induced in its respective digit-sense solenoid.

It will thus be evident from the foregoing that the binary digit 1 or 0 stored in each bit on the rod during a writing operation can be determined during a reading operation by noting whether the 0 or the 1 digit-sense solenoid of a bit has an output signal induced therein. For example, for bit 1 illustrated in FIG. 3, if the 1 digit-sense winding has an output signal induced therein during the reading operation a 1 is indicated, or conversely, if the 0 digit-sense winding has an output signal induced therein during the reading operation, then a 0 is indicated.

The above description of a typical reading and writing operation in a two magnetic element per bit arrangement on a rod structure has assumed that only a partial switching of the selected 1 or 0 bistable element of each bit occurs—that is, as indicated in FIG. 3, the selected bistable element is driven only to point $P_2$ in FIG. 3 rather than all the way to the other saturation state. It will be understood that such partial switching operation may be accomplished by appropriately controlling the magnitude and time duration of the write and digit current pulses $(I_W+I_D)$, since the write disturb characteristics of a bistable magnetic element are dependent upon both the magnitude as well as the time duration of the resultant writing current waveform. It will also be understood that for partial switching, it is preferable that a hysteresis loop with sloping sides be employed as illustrated in FIG. 3.

Such partial switching operation as described above permits a much faster cycle time to be achieved, since the time necessary for such partial switching (during both reading and writing) can be very much smaller than would be necessary if switching from one saturation state to the other were required. However, while such partial switching may permit a much faster cycle time, it will be evident that the change of flux occurring is correspondingly smaller, making it difficult to obtain a useable signal-to-noise ratio in a memory matrix. In accordance with the present invention, however, a memory matrix construction and arrangement is provided which takes advantage of the thin film rod memory construction to provide such a remarkably high degree of balancing that almost perfect noise cancelling can be achieved. The result is that an output signal which would otherwise be unusably small is now useable so that full advantage may be taken of partial switching techniques to greatly increase the memory read-write cycle time, permitting a practical size memory to be achieved with a cycle time of the order of 100 nanoseconds. Also, the high degree of balancing and noise cancellation achieved by the present invention permits a higher packing density as well as permitting a significant reduction in memory current requirements.

The manner in which the digit-sense and word windings in the matrix of FIG. 1 are arranged and interconnected in order to achieve a high degree of noise cancellation in accordance with the invention will now be considered in detail with additional reference to FIGS. 4–8.

Figure 4:
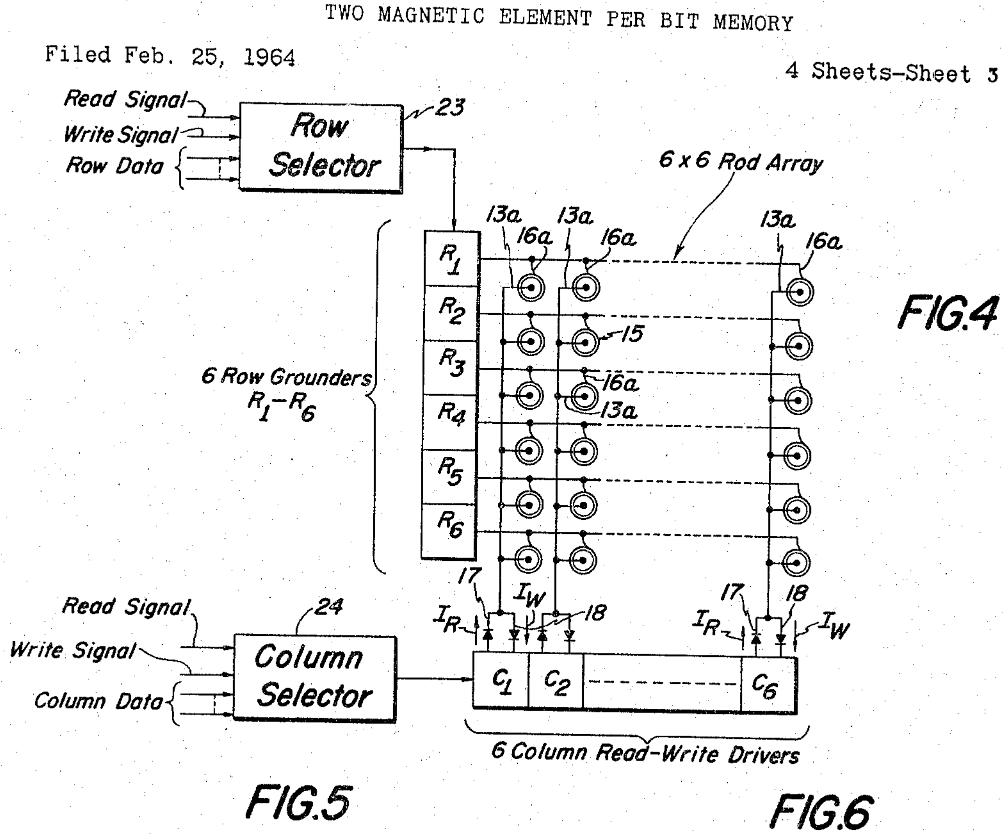
FIG. 4 is a schematic and electrical diagram illustrating how the word windings of the rods in the matrix of FIG. 1 may be connected in a linear selection arrangement so as to permit a word winding of a selected rod structure to be selected to receive either a read or a write current.

Considering first the connection and arrangement of the word windings, it will be understood from FIGS. 1, 2 and 4 that the return path for the word winding 16 on each rod structure 15 is provided by utilizing the inner conductive substrate 13 to which the back end of the word winding 16_b_ (FIGS. 1 and 7) is suitably connected at the back of the rod, such as by soldering. Then, by providing a lead wire 13_a_ connected to the inner substrate 13 at the front of each rod structure, the two leads 13_a_ and 16_a_ will be available at the front of each rod structure for interconnection in a conventional linear selection word line arrangement, as illustrated in FIG. 4.

It is to be noted that the use of the inner conductive substrate 13 of each rod structure 15 as a return path as just described not only eliminates the need for an additional return path, but also provides a circular or transverse field (which is in addition to the axial field) and aids switching so that a smaller read and write current can be used. But most importantly, the circular or transverse magnetic field produced by current flow in the inner substrate 13 acts to cancel the external or stray circular magnetic field produced around each rod by the word line and the pitch of the word windings, thereby reducing this type of inter-rod coupling. It may also be noted that inter-rod coupling due to the stray axial field is already greatly reduced, since the cross-sectional area of each rod is so small (of the order of .010 inch) that it will couple very little of the axial field of an adjacent rod.

Having explained how stray coupling between rods is greatly reduced by the rod construction employed herein, it will next be explained how the linear selection word line arrangement of FIG. 4 operates to permit a particular word line or a rod structure to be selected for receipt of a read current pulse $I_R$ or a write current pulse $I_W$. It will be seen in FIG. 4, that the leads 16_a_ from the rod structures in each of the six rows are connected together and to a respective one of the six row grounders $R_1$–$R_6$, while the leads 13_a_ from the rod structures in each column are connected together and to a respective one of the six column drivers $C_1$–$C_6$ through a respective pair of oppositely poled diodes 17 and 18.

It will be understood that such a connection of windings as shown in FIG. 4 (conventionally referred to as a linear selection arrangement) permits the word windings of a single predetermined rod word line 13_a_, 16_a_ to be selected to receive a read or write current. This is accomplished by activating the column driver and row grounder which correspond to the row-column coordinates of the rod structure which is to be selected. For example, selection of column driver $C_1$ and row grounder $R_1$ during a reading operation with result in a read current $I_R$ flowing only in the word winding of the rod structure in row 1 and column 1, since only this word winding will have a completed path for the flow of read current $I_R$ from $C_1$ to $R_1$. As is well known with regard to linear selection systems, diodes 17 and 18 (one for the read current $I_R$ and the other for the write current $I_W$) are provided for each column driver in order to prevent sneak currents from flowing in unselected lines.

From the foregoing description of FIG. 4, it should now be evident that the read and write currents $I_R$ and $I_W$ required during reading and writing into and out of the binary digits or bits on a selected rod structure (as previously described) may readily be provided in a conventional manner, such as illustrated in copending application Serial No. 268,145, filed March 26, 1963. It is merely necessary to design the column drivers and row drivers so as to be individually selectable (such as by row selector 23 and column selector 24 in FIG. 4) to supply read and write currents $I_R$ and $I_W$ during respective read and write periods in accordance with the row-column coordinates of the selected rod structure. As is conventional, the operation of the typical embodiment of the invention being described herein is such that a writing operation always follows a reading operation, either to re-write the data which was read out during reading, or to write in new data. Also, only one word is read out or written into during each read-write cycle.

Figure 5:
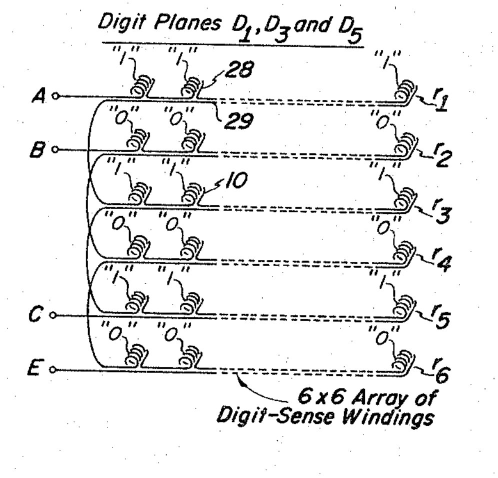
FIGS. 5 and 6 are schematic partially pictorial views illustrating the connection of the digit-sense windings in each digit plane of the matrix of FIG. 1.
Figure 6:
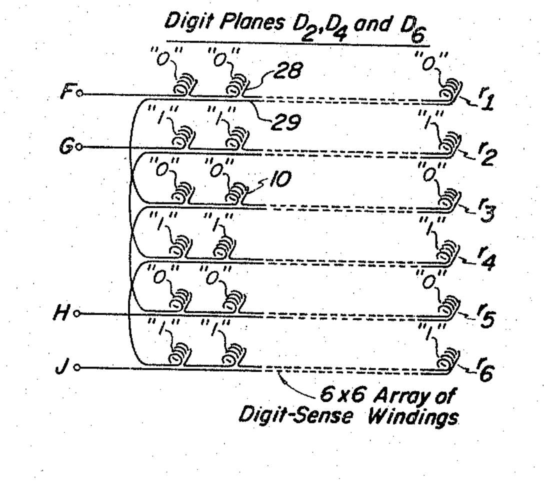

Now that the linear selection interconnection arrangement of the rod word windings has been explained, the interconnection arrangement employed for the digit-sense windings will next be considered with particular reference to FIGS. 1, 5 and 6. It will be remembered that the digit-sense windings perform the digit function during writing and the sensing function during reading so that the interconnection arrangement must take this into account. Also, the interconnection arrangement must provide for appropriate noise cancellation which, as will shortly become evident, it provided to an extremely high degree in accordance with the present invention.

Referring to FIGS. 5 and 6, it will be noted that FIG. 5 shows the winding arrangement for the digit-sense solenoids in digit planes $D_1$, $D_3$ and $D_5$, while FIG. 6 shows the winding arrangement for the digit-sense solenoids in digit planes $D_2$, $D_4$ and $D_6$, the digit planes being located as shown in FIG. 1. As indicated in FIGS. 1, 5 and 6 the solenoids in each digit plane are wound serially in each row, and the return wire for each row (such as indicated at 29 in FIGS. 1 and 6) is looped back along a path adjacent the solenoid interconnecting wires of the same row. By so doing, circular magnetic fields produced by inter-solenoidal connection wires in each row will be substantially cancelled in a manner similar to that achieved using the inner conductive substrate 13 as the return path as was described previously. To provide even further magnetic field cancellation, the return wire for each individual ılenoid (indicated by numeral 28 in FIGS. 1 and 6) is ɛrpendicularly returned adjacent and in contact with its ɛspective solenoid so as to approximately cancel out the rcular magnetic field produced by the pitch of the ılenoid.

Continuing with the description of the digit-sense inding arrangement, it will be seen from FIGS. 5 and that, in each digit plane, all of the odd rows ($r_1$, $r_3$ and ) of digit-sense windings are connected together to ɔrm a first series string (across points A and C in FIG. and points F and H in FIG. 6), and all of the even rows $r_2$, $r_4$ and $r_6$) of digit-sense windings are connected to-ɛther to form a second series string (across points B ıd E in FIG. 5 and G and J in FIG. 6). In addition, as ıdicated by appropriate 1 and 0 designations, the ar-ıngement of digit-sense windings is such that, in digit lanes $D_1$, $D_3$ and $D_5$ illustrated in FIG. 5, the digit-ɛnse windings in odd rows are associated with the 1 istable element of their respective binary digits, while ıe digit-sense windings in even rows are associated with ıe 0 bistable element of their respective binary digits. ı digit planes $D_2$, $D_4$ and $D_6$ illustrated in FIG. 6, it will e seen that the opposite 1 and 0 designations exist, the dd row digit-sense windings being associated with the bistable elements of their respective binary digits, and ıe even row digit-sense windings being associated with ıe 1 bistable elements of their respective binary digits.

Figure 7:
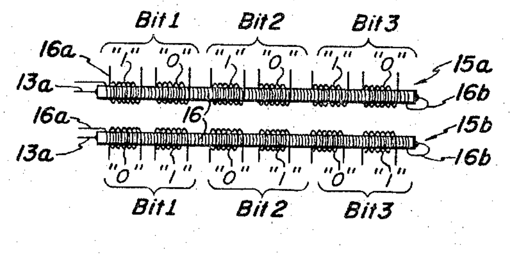
FIG. 7 illustrates the bistable magnetic designations provided along an odd row rod structure and an even row rod structure as a result of the digit-sense winding arrangement of FIGS. 5 and 6.

The resulting rod structure arrangement of 0 and 1 istable elements provided by the digit-sense winding rrangement of FIGS. 5 and 6 is illustrated in FIG. 7 ɔr an odd row rod structure 15_a_, and for an even row tructure 15_b_.

The manner in which the above-described digit-sense vinding arrangement is connected to a sense amplifier ı accordance with the invention so as to achieve a high egree of noise cancellation will next be considered with eference to FIG. 8. It will be understood that since ach word in the exemplary matrix illustrated in FIG. 1 ıas three binary digits or bits, three sense amplifiers are equired, one for each binary bit. More specifically digit ılanes $D_1$ and $D_2$ corresponding to bit 1 have their ligit-sense windings connected to a bit 1 sense amplifier, ligit planes $D_3$ and $D_4$ corresponding bit 2 have their ligit-sense windings connected to a bit 2 sense amplifier, ınd digit planes $D_5$ and $D_6$ corresponding to bit 3 have heir digit-sense windings connected to a bit 3 sense am-ılifier.

While FIG. 8 illustrates the sense amplifier connection 'or only planes $D_1$ and $D_2$ corresponding to bit 1, it vill be understood that the digit planes for bits 2 and 3 ıre connected to their respective bit sense amplifiers in a imilar manner. Since digit planes $D_1$, $D_3$ and $D_5$ are he same, digit planes $D_3$ and $D_5$ will be connected to their 'espective bit sense amplifiers in the same way as illus-rated for digit plane $D_1$ in FIG. 8; also, since digit planes $D_2$, $D_4$ and $D_6$ are the same, digit planes $D_4$ and $D_6$ will ɔe connected to their respective bit sense amplifiers in he same way as illustrated for digit plane $D_2$ in FIG. 8.

Now considering FIG. 8 in detail, it may be noted at he outset that the points designated by letters A, B, C, E, H and J in FIG. 8 correspond to like-lettered points n FIGS. 1, 5 and 6, thereby permitting each series string ɔf digit-sense windings to be easily identified. For ex-ample, the series-connected string of 18 1 digit-sense windings in odd rows of digit plane $D_1$ shown connected across points A and C in FIG. 8 represents the series-connected string of digit-sense windings in odd rows $r_1$, $r_3$ and $r_5$ in FIG. 5, which are also shown connected across points A and C and will be seen to comprise 18 1 digit-sense windings as designated in FIG. 8.

The sense amplifier coupling means provided between the digit-sense windings of each bit and its respective bit sense amplifier may typically comprise a sense amplifier transformer 50 as indicated for the bit 1 sense amplifier in FIG. 8. The transformer 50 has three windings 51, 52 and 53, a "dot" being provided at one end of each transformer winding in a conventional manner to indicate the widing polarity. For the sake of this description, the dot will be considered to represent a positive polarity. As shown in FIG. 8, winding 51 is connected across points F and G, winding 52 is connected across points A and B (points A and G and points B and F being connected in the same polarity sense), and winding 53 is fed to the sense amplifier. Windings 51 and 52 are center-tapped and each center tap is connected to circuit ground through an impedance $Zo/2$, where $Zo$ is the characteristic impedance of the respective digit-sense lines connected thereto, such impedance terminations serving to prevent unwanted reflections.

At the right in FIG. 8, the manner in which digit current is applied to the digit-sense windings of planes $D_1$ and $D_2$ is illustrated. It will be seen that digit plane $D_1$ is provided with a driver 40 and digit plane $D_2$ is provided with a driver 60, each driver being capable of providing an output current pulse $2I_D$ in response to a signal received from a digit plane selector 75. It will be understood that only one of the drivers 40 and 60 is activated by the selector 75 during a writing interval, depending on whether a 0 or a 1 is to be written into the respective bit. As indicated in FIG. 8, the digit current $2I_D$ produced by each digit driver when activated is fed in parallel to the odd and even digit-sense windings of the respective plane through respective suitably matched isolating diodes (41 and 42 for digit plane $D_1$ and 61 and 62 for digit plane $D_2$). Since the driver digit current of $2I_D$ divides equally between the odd and even series-connected strings of digit-sense windings, the resulting digit current flowing in each digit-sense winding of the selected digit plane will be of value $I_D$ in accordance with the previously described writing operation. An impedance of $2Zo$ (where $Zo$ is again the characteristic impedance) is connected across points C and E and across points H and J in FIG. 8, which is done in order to provide proper line terminating impedances which will eliminate reflections.

It is to be understood that instead of feeding the output of the digit drivers $D_1$ and $D_2$ to their respective series strings via diodes 41, 42, 61 and 62 as shown in FIG. 8, these diodes could be eliminated, in which case the drivers $D_1$ and $D_2$ would be fed to their respective series strings by connecting the output of each driver to approximately the center of a respective one of the impedances $2Zo$, as illustrated for the $D_1$ driver 40 in FIG. 8_a_.

With the above description of the matrix and its winding arrangement in view, the overall operation of the matrix will now be illustrated by describing an example of a typical read-write cycle involving the rod structure in row 1 and column 1, which will be assumed to store the three-bit word 101 which is to be read out and a new three-bit word 010 written therein.

The read-write cycle may be considered to be initiated by the appearance of a read signal which is applied to the row selector 23 and the column selector 24 in FIG. 4 along with respective row and column data to permit selection of the desired row grounder and column driver during the reading operation. Since the rod structure in row 1 and column 1 is the selected one in the present example, the row selector 23 will select row grounder $R_1$ while the column selector 24 will select column driver $C_1$. As a result, a read current $I_R$ will flow from column driver $C_1$, through its respective diode 17, through the word winding 16 (see FIGS. 1, 2 and 7) of the rod structure in column 1 and row 1, and back to circuit ground through row grounder $R_1$. The effect of the read current $I_R$ flowing in the word winding 16 of the selected rod structure is to cause all of the six bistable elements thereon to be driven to point $P_4$ in FIG. 3.

Since in the present example it is assumed that the row 1, column 1 rod structure stores the word 101, the 1 bistable element of bit 1, the 0 bistable element of bit 2, and the 1 bistable element of bit 3 will be driven from $P_3$ to $P_4$ in FIG. 3 by read current $I_R$, causing an output pulse to be induced in each respective digit-sense winding. Considering only bit 1 for the moment, it will be understood from FIGS. 5, 6 and 8 that the output pulse induced in the 1 digit-sense winding of bit 1 of the row 1, column 1 rod (which is in an odd row) will appear in the series string A–C of digit plane $D_1$. Since the series string A–C is connected to the dotted end of transformer winding 52 in FIG. 8, the signal induced in series string A–C will cause a positive 1 output signal (as typically illustrated in FIG. 9) to be applied to the bit 1 sense amplifier from transformer winding 53 to thereby indicate the storage of a 1 in bit 1 of the selected word. Since bit 3 also contains a 1, the bit 3 sense amplifier will similarly receive a positive signal from series string A–C of digit plane $D_5$, via the respective sense amplifier transformer.

With regard to bit 2 of the selected word, which is assumed to store a 0, the driving of its 0 bistable element from point $P_3$ to point $P_4$ in FIG. 3 will induce an output signal in the series string F–H of digit plane $D_3$. Since series string F–H is applied to the undotted end of its respective bit 2 transformer winding 51 (as will be noted in FIG. 8 for digit plane $D_2$), a negative 0 output signal (as also illustrated in FIG. 9) will be applied to the bit 2 sense amplifier via the sense amplifier transformer 50 to indicate the storage of a 0 in bit 2 of the selected word.

It will be understood from FIG. 8 that if a rod structure in an even row were the selected one (instead of the assumed row 1, column 1 rod which is in an odd row) and if bit 1 of such an even rod were assumed to store a 1, then the driving of the 1 bistable element from $P_3$ to $P_4$ during reading will cause an output signal to be produced in series string G–J, and since string G–J is applied to the dotted end of transformer winding 51, a 1 output signal (FIG. 9) will be applied to the bit 1 sense amplifier indicative of a stored 1; correspondingly, if such an even rod were to store a 0 in bit 1, then the 0 bistable element would be driven from $P_3$ to $P_4$ during reading to cause an output signal to be produced in series string B–E, and since string B–E is fed to the undotted end of the respective transformer winding 52, a negative 0 signal (FIG. 9) will be applied to the respective bit sense amplifier indicative of a stored 0.

So far in this example, the paths of the output signals applied to the respective bit sense amplifier during reading have been traced and it has been shown how, during reading of a selected word, a positive 1 output signal (FIG. 9) is applied to each respective bit sense amplifier if the corresponding bit stores a 1, and a negative 0 output signal (FIG. 9) if the corresponding bit stores a 0.

Proceeding now to a consideration of the writing operation in the exemplary read-write cycle being illustrated, it will be understood that a writing operation may be initiated following the just described reading operation by applying a write signal to the row selector 23 and column selector 24 in FIG. 4, along with respective row and column data to permit selection of the desired row grounder and column driver. Since the rod structure in row 1 and column 1 is the selected one in the present example, the row selector 23 will select row grounder $R_1$, while the column selector 24 will select column driver $C_1$, causing a write current $I_W$ to flow through the word winding 16 (FIGS. 1, 2 and 7) of the selected rod structure in row 1 and column 1.

It will be remembered from the previous discussion in connection with FIG. 2 that neither write current $I_W$ nor the digit current $I_D$, by itself, is sufficient to drive the six bistable elements on the selected rod out of the read saturation state (all bistable elements of the selected rod will reside at point $P_0$ in FIG. 3 after reading). As also explained previously in connection with FIG. 2, in order to provide for storage of either a 1 or a 0 in a bit, a digit current $I_D$ is applied simultaneously with the write current $I_W$ to either the 1 or 0 digit-sense winding, which together drive the thus selected respective bistable magnetic element of the bit to point $P_3$ in FIG. 3.

It will be seen in FIG. 8 that the write signal (which may be the same as applied to the row selector 23 and column selector 24 in FIG. 4) is also applied to a digit plane selector 75 along with digit plane data to indicate, in accordance with the word to be written (assumed to be 010), which of the two digit plane drivers provided for each bit (such as $D_1$ and $D_2$ for bit 1) is to be selected during writing. The manner in which digit current is caused to flow in the proper 0 or 1 digit-sense winding of each bit of the selected word will now be illustrated by considering how it is accomplished for bit 1, which the present example assumes is to have a 0 written therein.

Initially, it is to be noted that the bit 1 0 digit winding of the row 1, column 1 rod structure is located in row 1 of digit plane $D_2$ (FIG. 6), so as to thereby be in the series string F–H of FIG. 8. Consequently, in order to write a 0 in bit 1, the digit plane selector 75 will select the $D_2$ driver 60, which in turn will cause a digit current $I_D$ to flow in the series string F–H containing the bit 1 0 digit-sense winding; the sum of the write current $I_W$ and the digit current $I_D$ will then drive the respective 0 bistable element of bit 1 to point $P_3$ in FIG. 3 to thereby write a 0 in bit 1. It will be noted that selection of the $D_2$ driver 60 not only causes a digit current $I_D$ to flow in the digit-sense winding of the selected rod, but also the other digit-sense windings in the series string F–H, as well as the digit-sense windings in string G–J. However, such digit current flow will not cause unwanted switching, since these digit-sense windings are not on the selected rod, in which case their respective bistable magnetic elements will receive only the digit current which by itself is insufficient to cause switching.

It will be understood that if it were desired to write a 1 in bit 1 instead of a 0, then the digit plane selector 75 would select the $D_1$ driver 40 instead of the $D_2$ driver 60, causing a digit current $I_D$ to flow in series string A–C which contains the 1 digit-sense winding of bit 1 of the selected row 1, column 1 word.

It is also to be understood that if the selected word were in an even row, instead of an odd row, and it were desired to write a 1 therein, then the $D_2$ driver 60 would be selected to cause a digit current $I_D$ to flow in series string G–J which contains the 1 digit-sense winding of bit 1. If, on the other hand, it were desired to write a 0 in bit 1 of such an even rod, then the $D_1$ driver 40 would be selected to cause a digit current to flow in series string B–E which contains the 0 digit-sense winding of bit 1.

From the foregoing it will be evident that at the end of the writing period the desired word will have been written into the selected rod structure in row 1, column 1 in accordance with the selection of digit drivers made by the digit plane selector 75. Since it is assumed the full word 010 is to be written into the row 1, column 1 rod structure, which is in an odd row, digit drivers $D_2$, $D_3$ and $D_6$ will be selected during the writing operation by digit plane selector 75, while digit drivers $D_1$, $D_4$ and $D_5$ will remain unselected.

Now that a typical read-write cycle has been described, it is of considerable importance to note that the matrix winding arrangement described herein additionally provides for the cancellation of unwanted signals or noise generated during reading.

As far as inter-rod coupling due to stray axial and circular magnetic fields is concerned, it has already been explained how the use of a small diameter rod and the provision of a return path in close proximity to the forward path greatly reduces such inter-rod coupling and permits a high packing density to be obtained. However, there are other forms of coupling which produce unwanted signals or noise which must be cancelled out if the resultant noise is to be kept small, such as the noise arising as a result of capacitive and inductive coupling between word lines and digit-sense lines. While techniques—such as the use of strobing, common mode rejection and noise cancelling lines—can help reduce noise to some extent, considerable noise still remains, primarily because of the difficulty of obtaining a complete cancellation at each instant of time without degrading the output signal.

In the present invention, advantage is taken of the formation of each binary digit as two adjacent highly uniform bistable elements on the same rod structure to provide a noise cancellation arrangement, as illustrated in FIGS. 6–8, which results in an extremely high degree of noise cancellation within each binary digit, which is in addition to the usual common mode noise cancellation, whereby the entire matrix as a whole has a very low noise figure. In other words, the digit-sense solenoids in each digit plane are connected in common mode rejection fashion, and in addition, the two digit-sense solenoids of each binary digit are connected in an opposite polarity sense. Thus, when the various possible sources of noise in a magnetic memory matrix are considered and their effect is traced in the inter-connection arrangement illustrated in FIGS. 6–8, it will become evident that not only is the usual common mode rejection provided, but also, noise which is generated in a digit-sense winding associated with one bistable magnetic element of a selected rod is automatically cancelled out by a substantially equal and opposite noise signal generated in the digit-sense winding associated with the other bistable magnetic element of the same binary digit or bit.

It is to be understood that while the foregoing disclosure has primarily been concerned with a particular illustrative matrix, various modifications and variations can be made in both construction and arrangement without departing from the scope of the invention. For example, instead of using an enable-enable mode of operation, as described herein, an enable-inhibit operative mode can be employed in which the digit current acts in an inhibiting manner with respect to the write current. Also, instead of using a continuous word winding 16 on each rod structure, a polarity of spaced series-connected windings could be employed with the word winding spacing corresponding to the spacing of the digit windings.

Also, it will be understood that, instead of representing the 1 and 0 states of a binary bit by switching either the 1 or 0 bistable element of the two bistable elements of which each bit is constituted, a representation can be employed where one bistable element always remains in the read saturation state (see FIG. 3), while the other bistable element is left in the read saturation state to represent a 0, or switched to represent a 1. For such a representation, the same basic digit-sense winding arrangement can be employed as illustrated in FIGS. 5 and 6 with the difference that all the digit-sense windings in planes $D_1$, $D_3$ and $D_5$ are 1 windings and all the digit-sense windings in planes $D_2$, $D_4$ and $D_6$ are 0 windings so that every rod structure in the matrix will have a 1=0 arrangement as illustrated by rod structure 15*a* in FIG. 7. In such an arrangement the 0 digit-sense windings never receive digit current and their associated bistable magnetic elements are therefore never switched out of the read saturation state; only the 1 digit-sense windings in planes $D_1$, $D_3$ and $D_5$ receive digit current in such an arrangement.

The manner of connection of the digit-sense windings to their respective bit sense amplifiers for this modified type of operation now being considered may be as illustrated in FIG. 10 for digit planes $D_1$ and $D_2$. FIG. 10 is arranged similar to FIG. 8, and the same letters A, B, C, E, F, G, H and J are employed for ease of understanding and comparison. It will be understood from FIG. 10 that, when a bit stores a 1, a 1 output signal (which may either be positive or negative as illustrated in FIG. 11) will be applied to the sense amplifier, via the sense amplifier transformer in response to a 1 bistable element in either string A–C or B–E being switched back to the read saturation state; on the other hand, if the bit stores a 0, a negligible output signal will be produced (as also illustrated in FIG. 11), since both bistable elements will already be in the read saturation state.

As far as writing is concerned in the arrangement of FIG. 10 since digit current is only applied to the 1 digit-sense windings, only one digit driver is required for each bit, as illustrated in FIG. 9 by the bit 1 driver 70 which feeds the 1 digit-sense winding strings A–C and B–E. The digit selector 75 in FIG. 8 then becomes the bit driver selector 80 shown in FIG. 10 having three outputs (one for each bit driver). The bit driver selector 80 operates during writing to select only those bit drivers whose respective bits are to have a 1 written therein.

It is further to be noted with respect to FIG. 10 that, by considering the various possible sources of noise and tracing their effect in the sense amplifier, it will become evident that this modified sense amplifier connection arrangement is able to achieve essentially the same high degree of noise cancellation as is achieved by the arrangement of FIG. 8.

The above examples of possible modifications and variations are only illustrative, and others could be provided. The present invention, therefore, is not to be considered as limited to the specific disclosure provided herein, but is to be considered as including all modifications and variations coming within the scope of the invention as defined in the appended claims.

What is claimed is:

1. In a two magnetic element per bit memory matrix, a plurality of rod elements each comprised of an inner substrate and a thin film of bistable magnetic material uniformly deposited thereon, a plurality of pairs of adjacent groups of concentric solenoids disposed on each rod element, each group including an output winding, the bistable thin film portion associated with each group being individually switchable and the two bistable thin film portions of each pair representing a binary digit, sense amplifier coupling means, and means connecting the two output windings of each pair to said sense amplifier coupling means in an opposite polarity sense.

2. In a two magnetic element per bit memory matrix, a plurality of rod elements, each rod element being comprised of a rod-like substrate and a continuous thin film of bistable magnetic material uniformly deposited thereon, at least first and second adjacent groups of solenoids disposed on each rod element and constituting a pair, each group including a word solenoid and a digit-sense solenoid having concentric portions, the bistable thin film portion in the immediate vicinity of each concentric group being individually switchable, means for applying read and write currents during separate read and write periods to the word solenoids on a selected rod element, means for applying digit current to at least one of said digit-sense solenoids of a selected pair but not to both at the same time, sense amplifier coupling means, and means coupling the digit-sense solenoids of each pair of said sense amplifier coupling means in an opposite polarity sense.

3. In a two magnetic element per bit memory matrix, a plurality of rod elements each comprised of an inner substrate having a continuous thin film of bistable magnetic material uniformly deposited thereon, a plurality of concentric solenoid groups disposed along each rod element so that like positioned groups on different rod elements correspond to the same digit plane, each concentric group including at least a word solenoid and a digit-sense solenoid and the bistable thin film portion in the immediate vicinity of each concentric group being individually switchable, each pair of adjacent individually switchable bistable thin film portions on the same rod element corresponding to a binary digit whereby each pair of adjacent digit planes corresponds to the same binary digit for all rod elements in the matrix, means for applying read and write currents during separate read and write periods to the word solenoids of a single selected rod element, means for applying digit current to the digit-sense windings in selected digit planes but not to more than one of the digit planes of the same binary digit at the same time, a sense amplifier coupling means for each group of like binary digits, and means coupling the digit-sense solenoids in each pair of digit planes corresponding to the same binary digit to a respective sense amplifier coupling means so that common mode noise rejection is achieved for digit-sense solenoids in the same digit plane and so that the two digit-sense solenoids of each binary digit are connected in an opposite polarity sense.

4. In a two element per bit memory matrix, a plurality of individually switchable bistable elements arranged in a plurality of pairs of digit planes, each digit plane comprising an array of bistable elements with like positioned elements in different digit planes aligned, each pair of aligned bistable elements in adjacent digit planes corresponding to a binary digit, means for switching a selected group of aligned bistable elements, an output winding coupled to each bistable element, a sense amplifier coupling means for each group of like binary digits, and means coupling the output windings in each pair of digit planes corresponding to the same binary digit to its respective sense amplifier coupling means so that the two output windings of each binary digit are coupled in an opposite polarity sense.

5. In a two magnetic element per bit memory matrix, a plurality of individually switchable uniformly deposited thin film bistable magnetic elements arranged in a plurality of pairs of digit planes, each digit plane comprising a row-column array of bistable elements with like positioned elements in different digit planes aligned, each pair of aligned bistable elements in adjacent digit planes corresponding to a binary digit, linear selection means for selecting a single group of aligned bistable elements for switching, an output winding coupled to each bistable element, means connecting the output windings in each digit plane so as to form first and second series strings of output windings having substantially identical noise characteristics, a sense amplifier coupling means for each group of like binary digits, and means coupling the thus formed series strings in each pair of digit planes corresponding to the same binary digit to its respective sense amplifier coupling means so that the first and second series strings are coupled in an opposite polarity sense in each digit plane and in the same polarity sense in different digit planes of each pair.

6. In a two magnetic element per bit memory matrix, a plurality of individually switchable thin film bistable magnetic elements arranged in a plurality of pairs of digit planes, each digit plane comprising a row-column array of bistable elements with like-positioned elements in each digit plane aligned, each pair of aligned bistable elements in adjacent digit planes corresponding to a binary digit, means for partially switching from an initial state selected ones of the bistable elements in a single group of aligned elements but no more than one bistable element in each pair at a time, means for driving a single selected group of aligned bistable elements so as to cause any partially switched elements in the group to return to said initial state, an output winding coupled to each bistable element, a sense amplifier coupling means for each group of like binary digits, and means coupling the output windings in each pair of digit planes corresponding to the same binary digit to its respective sense amplifier coupling means so that common mode noise rejection is achieved in each digit plane and so that the two output windings of each binary digit are coupled in an opposite polarity sense.

7. In a two magnetic element per bit memory matrix, a plurality of rod elements each comprised of an inner substrate and a continuous thin film of bistable magnetic material uniformly deposited thereon and capable of providing a plurality of pairs of individually switchable portions along the length of each rod element, each pair of adjacent thin film portions on the same rod element corresponding to a binary digit, means for partially switching from an initial state selected ones of the individually switchable portions along a selected rod element but no more than one bistable element in each pair at a time, means for driving the bistable thin film portions along a single selected rod element so as to cause any partially switched portions to return to said initial state, an output winding coupled to each bistable thin film portion, a sense amplifier coupling means for each group of like binary digits, and means coupling the output windings in each pair of digit planes corresponding to the same binary digit to its respective sense amplifier coupling means so that common mode noise rejection is achieved in each digit plane and so that the two output windings of each binary digit are coupled in an opposite polarity sense.

8. In a two magnetic element per bit memory matrix, a plurality of rod elements each comprised of an inner substrate and a continuous thin film of bistable magnetic material uniformly deposited thereon and capable of providing a plurality of pairs of individually switchable portions along the length of each rod element, each pair of adjacent thin film portions on the same rod element corresponding to a binary digit, means for partially switching from an initial state selected ones of the individually switchable portions along a selected rod element but no more than one bistable element in each pair at a time, means for driving the bistable thin film portions along a single selected rod element so as to cause any partially switched portions to return to said initial state, an output winding coupled to each bistable thin film portion, means connecting the output windings in each digit plane so as to form first and second series strings of output windings having substantially identical noise characteristics, a sense amplifier coupling means for each group of like binary digits, and means coupling the output windings in each pair of digit planes corresponding to the same binary digit to its respective sense amplifier coupling means so that the first and second strings are coupled in an opposite polarity sense in the same digit plane and in the same polarity sense in different digit planes of each pair.

9. In a two magnetic element per bit memory matrix, a plurality of parallel rod elements each comprised of an inner substrate having a continuous thin film of bistable magnetic material uniformly deposited thereon, a word solenoid disposed along each rod element, a plurality of digit-sense solenoids disposed along each rod element so that each plurality of like positioned digit-sense solenoids on different rod elements form a row-column array in a common digit plane, the bistable thin film portion in the immediate vicinity of each digit-sense solenoid being individually switchable, each pair of adjacent individually switchable bistable thin film portions on the same rod element corresponding to a binary digit whereby each pair of adjacent digit planes corresponds to the same binary digit for all rod elements in the matrix, means connecting the word solenoids of the rod elements in a linear selection arrangement, means connecting the digit-sense solenoids in each digit plane so as to form a first series string comprised of the digit-sense solenoids in odd rows and a second series string comprised of the digit-sense windings in even rows, a sense amplifier coupling means for each group of like binary digits, and means coupling the thus formed series strings in each pair of digit planes corresponding to the same binary digit to its respective sense amplifier coupling means so that the odd and even row series strings are coupled in an opposite polarity sense in the same digit plane and in the same polarity sense in different digit planes of each pair.

10. The invention in accordance with claim 9 wherein means are provided for applying read and write currents to a selected word solenoid and a digit current to the digit-sense solenoids in selected digit planes to cause the partial switching of one bistable thin film portion of a ir to represent one binary value and the partial switchg of the other bistable thin film portion of a pair to present the other binary value.

11. The invention in accordance with claim 9 wherein eans are provided for applying read and write currents a selected word solenoid and a digit current to the git-sense solenoids in selected digit planes to cause the ırtial switching of one bistable thin film portion of a ır to represent one binary value and the partial switchg of neither bistable thin film portion of a pair to repsent the other binary value.

12. In a two magnetic element per bit memory matrix, plurality of parallel rod elements, each rod element ɜing comprised of an inner substrate having a continuous in film of bistable magnetic material uniformly deposɜd thereon, a word solenoid disposed along each rod ement, a plurality of pairs of digit-sense solenoids disɔsed along each rod element so that each plurality of ke-positioned digit-sense solenoids on different rod eleıents form a row-column array in a common digit plane, ıe bistable thin film portion in the immediate vicinity f each digit-sense solenoid being individually switchable, ıch pair of adjacent individually switchable bistable thin lm portions on the same rod element corresponding to binary digit whereby each pair of adjacent digit planes orresponds to the same binary digit for all rod elements ı the matrix, means connecting the digit-sense solenoids ı each digit plane so as to form first and second series trings of output windings having substantially identical oise characteristics, means coupled to the word solenoids f said rod elements so as to cause a read or a write urrent to flow in the word solenoid of a single selected ɔw element during respective read and write periods, sense amplifier coupling means for each group of like ıinary digits, and means for applying during a write peiod a digit current in opposing fashion with respect to ach sense amplifier coupling means to the series strings n selected digit planes but not to both digit planes of the ame pair at the same time, the magnitude and duration ıf said write current and said digit current being chosen o that neither is sufficient alone to switch a bistable hin film portion out of its initial state but that both actng together are sufficient to cause partial switching of ach respective bistable thin film portion whose word and ligit-sense solenoids simultaneously receive write current ınd digit current, said read current being chosen to be at east sufficient by itself to cause any such partially switched bistable thin film portion whose respective word winding receives read current to be switched back to said initial state.

13. In a two magnetic element per bit memory matrix, a plurality of parallel rod elements each comprised of a long thin inner conductive substrate and a continuous thin film of bistable magnetic material deposited thereon, a uniform word solenoid wound along each rod and connected to the inner substrate at one end thereof, a plurality of digit-sense solenoids disposed along each rod element so that each plurality of like-positioned digit-sense solenoids on different rod elements form a row-column array in a common digit plane, the bistable thin film portion in the immediate vicinity of each digit-sense solenoid being individually switchable, each pair of adjacent individually switchable thin film portions on the same rod element corresponding to a binary digit whereby each pair of adjacent digit planes corresponds to the same binary digit for all rod elements in the matrix, means connecting the word solenoids of the rod elements in a linear selection arrangement by connecting to the free end of the word solenoid and the unconnected end of the conductive inner substrate of each rod element, means connecting the digit-sense solenoids in each row in series and looping back the return path closely adjacent the forward path in each row in a manner so as to substantially cancel stray fields, means connecting the series-connected rows of digit-sense solenoids in each digit plane so as to form a first series string comprised of the digit-sense solenoids in odd rows and a second series string comprised of the digit-sense solenoids in even rows, a sense amplifier coupling means for each group of like binary digits, and means coupling the thus formed series strings in each pair of digit planes corresponding to the same binary digit to its respective sense amplifier coupling means so that the odd and even row strings are coupled in an opposite polarity sense in the same digit plane and in the same polarity sense in different digit planes of each pair.

14. The invention in accordance with claim 13, wherein the bistable thin film portions in odd and even rows of each digit plane respectively represent opposite binary values, and wherein the bistable thin film portions in odd and even rows of one digit plane of a pair respectively represent opposite binary values to those represented in respective odd and even rows of the other digit plane of the pair.

15. The invention in accordance with claim 13 wherein the bistable thin film portions in each digit plane represent the same binary value, and wherein the bistable thin film portions in the two digit planes of a pair represent opposite binary values.

References Cited by the Examiner

UNITED STATES PATENTS

| | | | |
|---|---|---|---|
| 2,666,151 | 1/1954 | Rajchman et al. | 307—88 |
| 2,998,594 | 8/1961 | Jones | 340—174 |
| 3,023,320 | 2/1962 | Kahn et al. | 307—88 |
| 3,042,905 | 7/1962 | Kosonocky | 340—174 |
| 3,067,408 | 12/1962 | Barrett | 340—174 |
| 3,105,959 | 10/1963 | Klinkhamer | 340—174 |
| 3,105,962 | 10/1963 | Bobeck | 340—174 |
| 3,121,862 | 2/1964 | Ridenour et al. | 340—174 |

BERNARD KONICK, *Primary Examiner.*

S. M. URYNOWICZ, *Assistant Examiner.*